June 20, 1961 C. L. HAMM ET AL 2,988,886
COMBUSTION CHAMBER LOCKING DEVICE
Filed Sept. 1, 1959 2 Sheets-Sheet 1
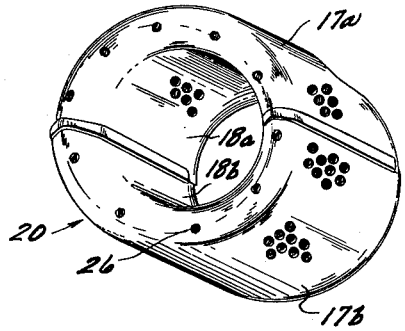
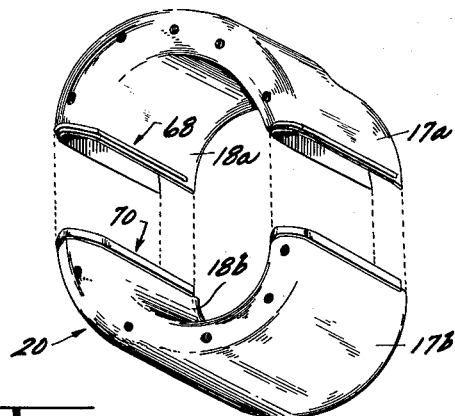
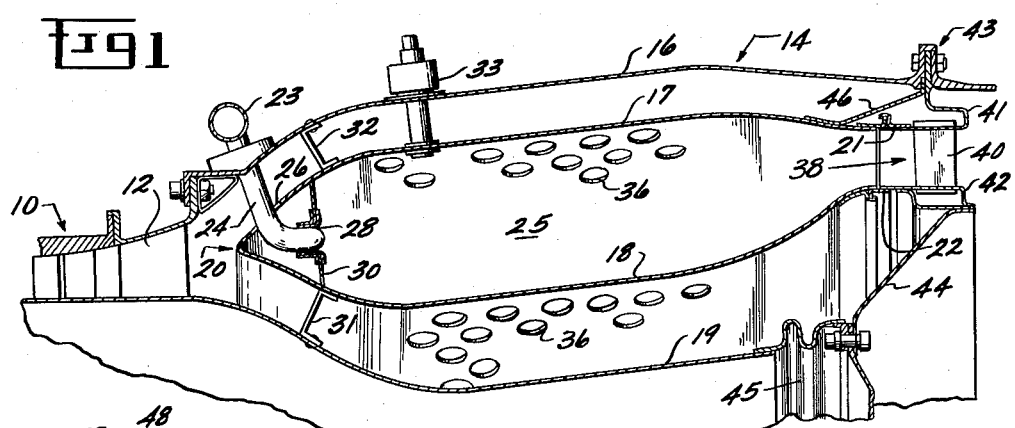
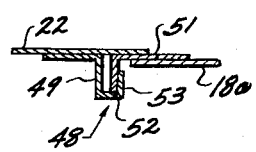
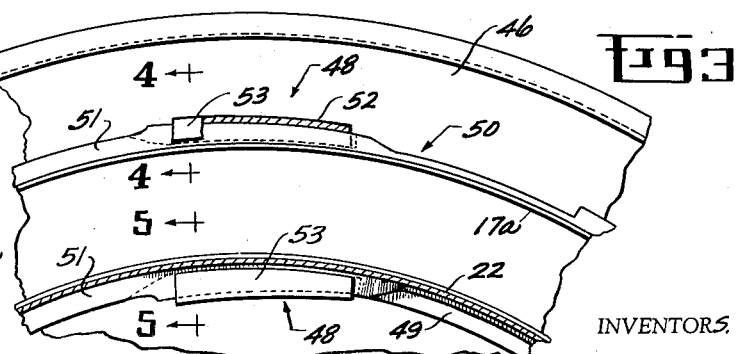
INVENTORS.
CLARENCE L. HAMM
BY WILLIAM E. BOURNE
Harry C. Burgess
ATTORNEY

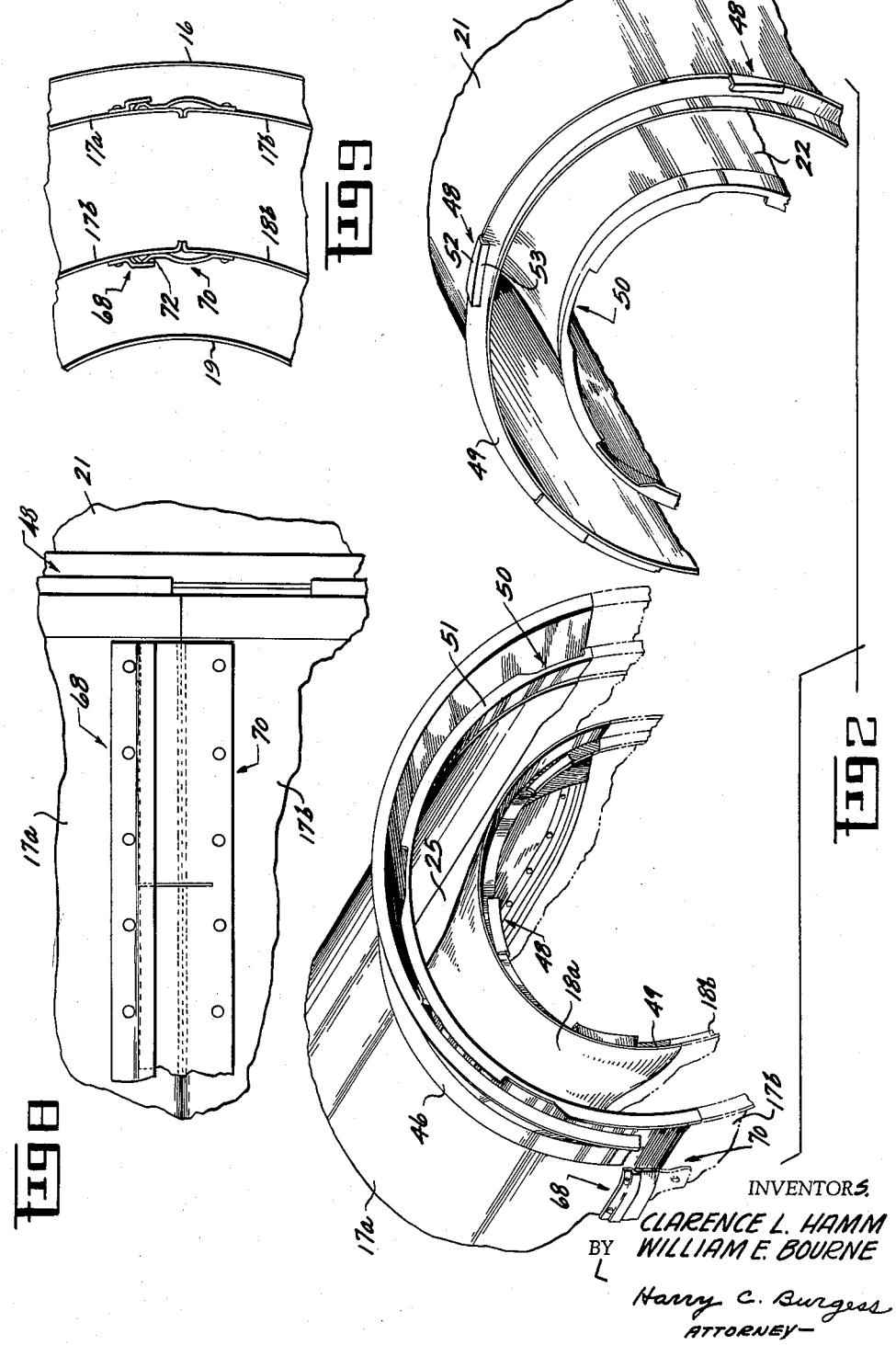

United States Patent Office 2,988,886
Patented June 20, 1961

2,988,886
COMBUSTION CHAMBER LOCKING DEVICE
Clarence Lockwood Hamm and William Edward Bourne, Marblehead, Mass., assignors to General Electric Company, a corporation of New York
Filed Sept. 1, 1959, Ser. No. 837,542
2 Claims. (Cl. 60—39.65)

This invention relates to a combustion chamber of a gas turbine engine, and, more particularly, to an annular combustion chamber liner locking and support device.

It is well known that the combustor in a gas turbine engine usually has a shorter life span than many of the other engine components, such as, for example, the compressor. This is primarily due to the extreme operating temperatures existing in the region of the combustion chamber. In the past, various ways have been suggested to alleviate the effects of extreme heat in the chamber, e.g., cooling ducts have been utilized to carry away the heat during engine operation. In spite of such efforts the combustor, particularly the combustor liner, has still required frequent replacement.

It was thought desirable, therefore, to provide some way by which a combustor liner could be easily removed from the combustion chamber and certain means were devised to accomplish this result. For example, it was suggested that the outer combustion chamber casing be split longitudinally, with the casing halves being held in place by means of flanges, in order to facilitate exposing the liner. Other suggestions have included the provision for an axially slidable outer casing.

In addition to providing means by which the liner may be made more easily accessible, a simple support and locking arrangement for the liner itself would also appear to be desirable. An ideal arrangement would be one that would combine a positive locking action with a minimum of leakage, but would also utilize a minimum of parts and require few tools for installing or removing the liner.

Accordingly, an object of this invention is to provide a simple locking device which will permit a combustor liner to be easily removed or replaced, which device will also provide the necessary support and incur a minimum of leakage.

A further object of this invention is to provide a simple, easily assembled and disassembled annular combustion chamber liner having a positive locking arrangement at the rear end thereof, which arrangement can be remotely locked and unlocked without the use of pins, screws, or separate tools or holding devices, and which arrangement provides the necessary support with a minimum of gas leakage.

Briefly stated, one embodiment of our invention comprises a combustion chamber locking and support arrangement for use with an annular combustion chamber liner, the arrangement including a plurality of tapered lugs connected to said liner and to a supporting member mounted rearwardly thereof, which lugs, when the liner is rotated about its axis, will lock within a plurality of slots contained in flanges carried by the liner and by another supporting member, concentrically mounted with the first-mentioned member, to secure the liner within the chamber and prevent gas leakage.

These and other objects and advantages of the invention will become more fully explained and understandable by a reading of the following specification and drawings wherein:

FIGURE 1 is a cross-sectional view of a gas turbine combustion chamber utilizing the invention, FIGURE 2 is a partial view of one-half of the annular combustion chamber liner, and a partial view of the rearwardly-mounted concentric supporting members, the liner and the members being shown in an opposed, disassembled relationship, FIGURE 3 is a partially cut-away view showing the position of the tapered lugs when locked in the slots, and FIGURES 4 and 5 are views taken along lines 4—4 and 5—5 of FIGURE 3, respectively, illustrating the positive locking action achieved through use of the tapered flanges, FIGURES 6 and 7 are pictorial views illustrating the use of a longitudinally-split annular liner, the liner halves being shown in an assembled and disassembled relationship, respectively, and FIGURES 8 and 9 are an elevation and an end view, respectively, illustrating details of the longitudinally-extending flanges utilized in joining the annular combustion chamber liner halves of FIGURES 6 and 7.

Referring now more particularly to FIGURE 1, shown therein is the combustion section of a typical axial-flow gas turbine engine. A compressor discharge nozzle indicated generally at 10 and having an annular outlet 12 is positioned forwardly of the combustion chamber, indicated generally at 14. The combustion chamber comprises primarily an outer casing 16, an outer liner 17, an inner liner 18, and an inner casing 19. The inner and outer liners have convergent forward portions which join at 20 to form the annular combustion chamber liner assembly, indicated at 25.

Disposed about the forward portion of the combustion chamber casing is a circumferentially-extending fuel manifold 23 from which extends a plurality of inwardly-directed fuel nozzles, one of which is shown at 24. The nozzles are angled so as to pass through holes 26 in the forward portion of the outer liner, the end of each nozzle being supported in a thimble 28 carried by a circular web 30 positioned slightly to the rear of the annular liner assembly "nose" 20. A plurality of circumferentially-spaced inner and outer brackets 31 and 32, respectively, attached to the inner and outer casings may be utilized to aid in positioning the liner assembly.

An ignitor plug 33, extending transversely of the combustion chamber and through the outer liner 17 is positioned rearwardly of the fuel nozzles. A plurality of holes or louvers 36 are provided in the inner and outer liners to facilitate burning and to aid in cooling the liner assembly.

To the rear of the combustion chamber is a turbine nozzle inlet, indicated generally at 38. Situated within the nozzle are a plurality of turbine nozzle vanes 40 supported by annular members 41 and 42 of a suitable configuration. The outer supporting member 41 is secured by a casing flange and bolt arrangement, indicated generally at 43, while the inner supporting member 42 is supported by a conical member 44 which is connected through an expandable member 45 to the inner combustion chamber casing 19. Also secured by the casing bolt and flange arrangement is a conical baffle member 46, which is adapted to slidably engage the outer portion of the annular liner when it is locked in place. The baffle 46 also serves to help position the annular liner assembly within the combustion chamber casing.

FIGURES 2, 4, and 5 perhaps best illustrate the combination locking and support arrangement which is the subject of the present invention. Referring now more particularly to the left-hand drawing of FIGURE 2, part of the outer portion of the annular combustion chamber liner assembly is shown at 17a and part of the inner portion is indicated at 18a. The right-hand drawing of FIGURE 2 shows part of an outer supporting member 21 and part of an inner supporting member 22, both of which are rigidly attached to the supporting rings 41 and 42 (or extensions thereof).

The locking and leakage preventing features of the combination locking and support arrangement are accomplished through use of (1) a plurality of tapered lugs, indicated generally at 48 in FIGURE 2, carried by a pair of L-shaped flanges 49—49 attached to the outer supporting ring 21 and the inner liner 18a adjacent the ends thereof, and (2) a plurality of slots, indicated at 50, which are cut in a second pair of L-shaped flanges 51—51 attached to the outer liner 17a and the inner supporting member 22 adjacent the ends thereof. The slots 50 are adapted to receive the tapered lugs 48, with a portion of each lug being designed to extend slightly beyond the slotted flange when so received.

Obviously, the position of the slots and lugs on the liners and the supporting members could be reversed within the spirit of the invention. Further, any number of lug and slot combinations of a suitable size could be utilized, whereas in the present embodiment only three per liner half are shown.

In order to hold gas leakage to an absolute minimum each lug 48 has a slightly tapered axially-extending portion 52 and a slightly tapered radially-extending portion 53. The tapers of these portions of the lugs extend in a direction opposite to that in which the annular liner will be rotated when it is locked in place within the chamber. Thus, when rotation occurs, the axially-extending tapered portions will first contact and then exert an increasing pressure on the peripheries of the slotted flanges 51, while the radially-extending tapered portions will likewise contact and then exert increasing pressure against the sides of the slotted flanges. The forces exerted by the lugs cooperating with the flanges will cause the supporting members and the liners, which will then be substantially in abutment, to be engaged with the flanges in a gas-tight fit.

From the above description, it will be noted that both a locking and tensioning action takes place when the lugs are rotated after being inserted in the slots. This, in combination with the positioning action of the brackets 31 and 32, and the cooperation of the nozzles 24 with the thimbles 28, provides a rigid support for the annular liner assembly, which support not only locks the assembly in place but is self-tightening to prevent leakage.

FIGURES 3, 4, and 5 perhaps more clearly illustrate how the slightly tapered axially and radially-extending lug portions 52 and 53, respectively, cooperate with the flanges 49—49 and 51—51 to effect a tensioning action. The dotted lines of FIGURE 3 also show the relative position of the slots 50 prior to rotation of the liner assembly.

FIGURES 6, 7, 8, and 9 illustrate the provision for longitudinally splitting the annular liner assembly. Although not part of our invention, the provision for splitting the liner assembly in half was adapted to facilitate easy removal installation of the assembly when in the "unlocked" position. The annular liner assembly halves, comprising sections 17a and 17b of the outer liner and sections 18a and 18b of the inner liner may be joined by any suitable flange arrangement. In the embodiment shown, this arrangement comprises a pair of curved, longitudinally-extending flanges, indicated generally at 68 and 70, which are disposed about the axially-extending edges of the annular liner halves. To aid in locking the liner assembly halves together, flange 70 may be bent at 72, the bent portion being received under the flange 68 when the halves are assembled.

When it becomes necessary to replace the liner assembly, the fuel manifold 23, fuel nozzles 24 and ignitor plugs 33 are first removed. The casing bolts are then unfastened which allows the outer casing 16 (which may also be split longitudinally) to be removed. The annular liner assembly is then rotated in order to bring the lugs 48 opposite the slots 50, at which time the assembly may be moved forwardly and out of engagement with the supporting rings 21 and 22. The upper half of the liner assembly is then removed by disengaging flanges 68 and 70 and lifting this half out of the engine. The lower half may then be rotated 180° and lifted out in a similar manner. Installation of a liner assembly may be accomplished by reversing this procedure.

The above described embodiment of our locking and support device is, of course, merely illustrative and it will be apparent that numerous modifications may be made within the scope of the invention as defined in the following claims:

We claim:

1. In combination, a replaceable annular combustion chamber liner assembly for use in a gas turbine engine combustion chamber having inner and outer casings, said assembly comprising a pair of spaced, concentric walls, said walls having sharply convergent forward portions which join circumferentially of the chamber to form the assembly and slightly convergent rear portions which are open to form an annular flame duct, and a locking and support arrangement for the liner assembly, said arrangement including a pair of concentric ring members rigidly affixed to a portion of the engine rearwardly of said assembly, said members being adapted to abut said rear portions of the liner assembly walls in an end-to-end relationship to form a continuation of said flame duct, a plurality of continuous relatively thin, flexible flanges, some of which are carried on the rear portions of said walls adjacent the abutting ends thereof, the remainder of which are carried on said ring members adjacent the abutting ends thereof, a series of lugs supported by a pair of said flanges, each of said lugs having a slightly tapered axially-extending portion and a slightly tapered radially-extending portion, and a series of slots adapted to receive said lugs, said slots being cut into flanges other than said lug-supporting flanges, the lug-supporting and the slotted flanges being carried in a manner such that when the liner assembly walls and the ring members are placed end-to-end with the lugs being received in said slots, the radially-extending portions and the axially-extending portions of the lugs will cooperate with said slotted flanges on rotation of said liner to positively lock the assembly in place within the chamber and, at the same time, tighten the fit to prevent gas leakage.

2. An axial flow gas turbine engine combustion chamber comprising: an outer combustion chamber casing; an inner combustion chamber casing; spaced outer and inner combustion chamber liners for use within said casings, said liners having sharply convergent forward portions which join circumferentially of the chamber to form a liner assembly, the liners also having slightly convergent rear portions which form an annular flame duct; fuel supplying means extending transversely of said chamber and engaging said liner assembly near the forward portion thereof; fuel igniting means positioned rearwardly of said fuel supplying means; means to position said liner assembly within said chamber including a conical baffle slidably engaging the outer liner adjacent the rear thereof; and a locking and support arrangement to enable said liner assembly to be easily removed from within said casings, said arrangement including concentric outer and inner cylinders, said cylinders being rigidly affixed to said engine rearwardly of said combustion chamber and forming a continuation of said annular flame duct when in abutment with said liners, a plurality of continuous relatively thin, sheet metal radially-extending flanges, a pair of which are attached to the peripheries of said liners adjacent the abutting ends thereof, another pair of which are attached to said cylinders adjacent the abutting ends thereof, a series of circumferentially-spaced lugs attached to one flange of each of said pairs of flanges, a series of circumferentially-spaced slots cut into the other flange of each of said pair of flanges in such a manner that each of said lugs will be capable of being received in one of said slots when said cylinders and said liners are in abutment, said lugs having radially-extending tapered portions which cooperate with the walls of opposing slotted flanges and axially-extending tapered portions which cooperate with the peripheries of opposing slotted flanges, respectively, on rotation of said liner assembly to positively lock the assembly in place and, at the same time, exert an increasing tension in order to prevent gas leakage.

References Cited in the file of this patent

UNITED STATES PATENTS

| | | |
|---|---|---|
| 2,328,068 | Harris | Aug. 31, 1943 |
| 2,702,454 | Brown | Feb. 22, 1955 |
| 2,760,338 | Keast | Aug. 28, 1956 |
| 2,872,971 | Clarke et al. | Feb. 10, 1959 |

FOREIGN PATENTS

| | | |
|---|---|---|
| 710,353 | Great Britain | June 9, 1954 |